3,026,301
STABILIZED POLYPYRROLIDONE
William O. Ney, Jr., Lincoln Township, Washington County, Minn., assignor to Minnesota Mining and Manufacturing Company, St. Paul, Minn., a corporation of Delaware
No Drawing. Filed Apr. 9, 1958, Ser. No. 727,265
7 Claims. (Cl. 260—78)

This invention relates to processes for the polymerization of pyrrolidone and more particularly to a process for polymerizing pyrrolidone in the presence of a stabilizing agent and the polypyrrolidone thereby produced.

The polymerization of pyrrolidone to form polypyrrolidone is well-known and has been described in United States Patents Nos. 2,638,463, 2,739,959 and 2,809,958.

The polypyrrolidone heretofore produced is a tough, useful thermoplastic which can be fabricated into various shapes. Although the polymer as heretofore known has many favorable characteristics, its thermal instability has limited its fabrication by processes of melt-extrusion or melt-spinning. It has been found that polypyrrolidone which is maintained in the molten state, or at temperatures near its melting point, undergoes a relatively rapid decrease in molecular weight. This tends to injure the properties of the residual polymer.

It is an object of this invention to provide a novel process for the polymerization of pyrrolidone, wherein an agent which improves the properties of the resulting polymer is employed. A further object is to provide polypyrrolidone having desirable thermal stability. Other objects will become evident hereinafter.

It has now been discovered that when pyrrolidone is polymerized in the presence of a basic catalyst and an activator, and in the further presence of relatively small amounts of hexamethylene diamine, the polypyrrolidone which is produced shows certain unusual and desirable properties. It is found, for example, that polypyrrolidone thus produced is remarkably different in its behavior on heating from polymer as ordinarily produced. The polypyrrolidone of the present invention does not tend to degrade in molecular weight on heating under vacuum at 250° C. for 1 hour as is characteristic of heretofore known polypyrrolidone; instead, it usually increases in molecular weight by a substantial amount as shown by the inherent viscosity. It is nevertheless fully equivalent to the heretofore known polypyrrolidone in its other properties, such as color, toughness, extrudability, melting point and the like physical properties.

This desirable polypyrrolidone is obtained when hexamethylene diamine is incorporated, in amounts of from about 0.05 to about 3 mole percent of the pyrrolidone monomer employed, into an otherwise conventional polymerization. The beneficial effect of the diamine is quite unexpected because it has heretofore been presumed that the presence of any amine tends to inhibit the polymerization reaction. Not only does the hexamethylene diamine not inhibit polymerization in this case, but instead it appears to stabilize the polymer against thermal molecular weight degradation.

No reason can be advanced for this striking and highly remarkable behavior, but it should be pointed out that such small amounts of an additive cannot be presumed to form a copolymer in the commonly accepted meaning of the term. The hexamethylene diamine appears to be incorporated into the polymer, or bound therein, in some manner. When hexamethylene diamine is mixed with polypyrrolidone after polymerization, the useful effects are not produced.

In carrying out the polymerization process, the alkaline catalysts and activators described in United States Patents Nos. 2,739,959 and 2,809,958 are used. Other activators, such as activators containing isocyanate groups, which are described in my copending application Serial No. 727,287 can also be employed. The amounts of catalyst and activator used are of the order of those described in the named patents.

Having thus described the invention in general terms it is now further illustrated by specific examples showing the best mode contemplated of practicing the invention, which are included for purposes of illustration only and are not limiting to the scope of this invention. In these examples, parts are by weight unless otherwise indicated and inherent viscosities are determined by standard methods at a concentration of about 0.2 g. per 100 ml. of m-cresol.

*Example 1*

In a vessel fitted for distillation under reduced pressure are placed 100 parts of pyrrolidone purified by redistillation (taking a middle cut after distilling once from about 2 percent of solid potassium hydroxide), and to the vessel are added 215 parts of xylene (Merck reagent grade, mixed isomers boiling 137° to 140° C.) and 1.36 parts (1 mole percent) of hexamethylene diamine. The vessel and contents are heated under about 18 mm. Hg pressure until xylene commences distilling at about 45° and then a solution of 2.2 parts of 85 percent potassium hydroxide (2.8 mole percent) in 3.0 parts of water is added. Distillation is continued under the same pressure to codistil water and xylene and finally to remove xylene until the contents of the vessel are at about 90° C. The vessel and contents are cooled to about 25° C. and the vacuum is broken with dry nitrogen gas. Agitation means is then inserted, and a solution of 3.3 parts (1 mole percent) of adipoyl dipyrrolidone in 125 parts of heptane is added and agitation commenced. The heat of the exothermic polymerization is controlled at about 30–40° C. by intermittent application of an ice bath. Within about 5 to 10 minutes a granular solid polymer is suspended in the diluent heptane. After stirring for 7 hours, the polymerization mixture is permitted to stand under an atmosphere of nitrogen at ambient temperatures for about 60 hours and is processed as follows.

The heptane containing traces of xylene is decanted as completely as possible and the granular polymer is broken up further in about 250 parts of methanol and collected. It is then washed successively for 1 to 2 hours each time and collecting after each wash as follows: twice with 200 parts of 1.0 percent aqueous acetic acid at 25° C., and finally with 175 parts of methanol at 25° C. for 1 hour. After again collecting, the polymer is dried for 16 hours at 70° C. in vacuo.

A portion of the white, hard solid polypyrrolidone thus obtained is heated in vacuo (less than $10^{-2}$ mm. Hg) for 30 minutes to determine its thermal stability at 250° C. It is found that the polypyrrolidone has an initial inherent viscosity of 1.40 and, after heating, an inherent viscosity of 1.84. The loss in weight owing to monomer evolution is 6.7 percent by weight.

When a representative polypyrrolidone sample prepared by the usual process and using an acyl activator of the type disclosed in the prior art is subjected to the same heating test, it is found that the inherent viscosity value of the sample before heating is 2.08 and after heating is 1.03. The loss in weight during the heating period is 12.7 percent.

*Example 2*

The procedure of Example 1 is repeated except that heptane is not employed. Before the addition of the activator, the anhydrous solution of potassium pyrrolidone and hexamethylene diamine in pyrrolidone is transferred to a thoroughly dry closeable container and 3.3 parts (1 mole percent) of adipoyl dipyrrolidone is added with mixing. Polymerization commences rapidly and the closed container is set aside for about 90 hours. The hard, white block of polymer which results is then worked up as follows: The block of polymer, ground to about 1/16 inch size on a Wiley laboratory mill, is washed with the succession of washes employed in Example 1, adding two water washings using 200 parts of water at 25° C. for 1 hours before the final methanol wash. The white, hard, solid polymer is then dried as in Example 1. It has a softening point of about 260° C. and inherent viscosity before heating, of 1.42.

The remarkable thermal stability of this polymer is shown by subjecting portions to heating under vacuum as above for 60 minutes at increasing temperatures. The results are shown in tabular form:

| Temperature of heating, °C. | Loss of weight, percent | Inherent Viscosity after heating |
| --- | --- | --- |
| 250 | 12.4 | 1.72 |
| 260 | 20.1 | 1.70 |
| 270 | 42 | 1.68 |

The increase in molecular weight which is retained under these successively higher temperatures is of great significance in the utility of polypyrrolidone at temperatures above its melting point. It will be noted that the rate of monomer evolution, the loss in weight, roughly doubles for each 10° C. rise in temperature, and that the polypyrrolidone nevertheless retains substantially the same increased molecular weight characteristic of the polypyrrolidone of this invention.

Example 3

A larger batch of polypyrrolidone is prepared by the procedure of Example 2 as follows. A vessel is charged with 2250 parts of pyrrolidone (purified by crystallization four successive times from toluene at −20° C.), 5625 parts of xylene and 30.6 parts (1 mole percent) of hexamethylene diamine. This charge is heated under reduced pressure and 52.5 parts of 85 percent potassium (3.0 mole percent) in 30 parts of water are added. Water and xylene are codistilled at about 15 mm. Hg pressure at vapor temperatures from about 32° to about 50° C. (pot temperatures about 40° to about 90° C.). About 15 percent of the initial charge of hexamethylenediamine is found to codistill and is thus lost to the reaction so that the concentration in the solution is actually about 0.85 mole percent.

The anhydrous solution of potassium pyrrolidone and hexamethylene diamine in pyrrolidone is distributed among a series of closeable containers of convenient size to each of which is then added with mixing 3.3 percent by weight (1 mole percent) of the contents of adipoyl dipyrrolidone. Polymerization proceeds readily in each container. After about 48 hours, the polymers resulting from the several parallel polymerizations are combined, broken up in a resin mill (such as model 00 Abbe pulverizing grinding machine made by the Abbe Engineering Co. of New York, N.Y.) to about 1/16 inch size and washed at room temperature successively with 5000 parts of 1 percent aqueous acetic acid for 8 hours, with 5000 parts of 1 percent aqueous acetic acid for one hour, twice with 5000 parts of distilled water for one hour and with 3500 parts of methanol for 15 minutes. The white, hard solid polypyrrolidone is then dried at 50° C. for 16 hours. When tested as above described it is found to have an initial inherent viscosity of 1.39, and after heating at 250° C. in vacuo for 60 minutes, an inherent viscosity of 1.81, with a weight loss during heating of 9.3 percent. It can be extruded to form an orientable monofilament.

Example 4

About 100 parts of an anhydrous 2.8 mole percent solution of potassium pyrrolidone in pyrrolidone is prepared by the procedure described in Example 1, omitting the addition of hexamethylene diamine at that point, and the solution is distributed equally among four closeable containers as described in Example 3. After adding to each container the concentrations of hexamethylene diamine and activator hereinbelow indicated, polymerization is permitted to proceed for 72 hours. The several polymers are worked up separately by the procedure described in Example 2. The inherent viscosities before and after heating at 250° C. for 1 hour as in Example 2 and the yields of polymer are indicated below.

| Activator | Mole percent hexa-methylene diamine | Percent Yield | Inherent Viscosity Before heating | Inherent Viscosity After heating |
| --- | --- | --- | --- | --- |
| 0.3 mole percent phenyl-isocyanate. | 0.075 | 75.3 | 1.81 | 1.90 |
| Do | 0.30 | 57.6 | 1.37 | 2.11 |
| Do | 1.20 | 34.8 | 1.00 | 1.89 |
| 0.3 mole percent adipoyl dipyrrolidone. | 1.20 | 29.8 | 1.30 | 1.65 |

What is claimed is:

1. Polypyrrolidone containing from about 0.05 to about 3 mole percent of hexamethylene diamine based upon the amount of pyrrolidone employed and coreacted with said pyrrolidone.

2. In the polymerization of pyrrolidone in the presence of an alkaline polymerization catalyst and an activator for the polymerization selected from the group consisting of acyl group containing activators and isocyanate group containing activators for the polymerization of pyrrolidone, the improvement which comprises carrying out the polymerization of the said pyrrolidone in the presence of about 0.05 to about 3 mol percent of hexamethylene diamine, based on the amount of pyrrolidone present, which coreacts therewith.

3. The process of claim 2, wherein the activator is an acyl activator.

4. The process of claim 2 wherein the activator is an isocyanate activator.

5. The process of claim 2 wherein the alkaline polymerization catalyst is an alkali metal salt of pyrrolidone.

6. In the polymerization of pyrrolidone in the presence of an alkaline polymerization catalyst and adipolyl dipyrrolidone as an activator for the polymerization, the improvement which comprises carrying out the polymerization of the said pyrrolidone in the presence of from about 0.05 to about 3 mole percent of hexamethylene diamine, based upon the amount of pyrrolidone present, which coreacts therewith.

7. In the polymerization of pyrrolidone in the presence of an alkaline polymerization catalyst and phenyl isocyanate as an activator for the polymerization, the improvement which comprises carrying out the polymerization of the said pyrrolidone in the presence of from about 0.05 to about 3 mole percent of hexamethylene diamine, based upon the amount of pyrrolidone present, which coreacts therewith.

References Cited in the file of this patent

UNITED STATES PATENTS

| | | |
| --- | --- | --- |
| 2,241,322 | Hanford | May 6, 1941 |
| 2,806,856 | Robinson | Sept. 17, 1957 |
| 2,809,958 | Barnes et al. | Oct. 15, 1957 |

FOREIGN PATENTS

| | | |
| --- | --- | --- |
| 205,015 | Australia | Jan. 31, 1957 |

UNITED STATES PATENT OFFICE
CERTIFICATE OF CORRECTION

Patent No. 3,026,301　　　　　　　　　　　　　　March 20, 1962

William O. Ney, Jr.

It is hereby certified that error appears in the above numbered patent requiring correction and that the said Letters Patent should read as corrected below.

Column 3, line 42, after "potassium" insert -- hydroxide --.

Signed and sealed this 10th day of July 1962.

(SEAL)
Attest:

ERNEST W. SWIDER
Attesting Officer

DAVID L. LADD
Commissioner of Patents